United States Patent [19]

Yamamoto et al.

[11] Patent Number: 4,520,070

[45] Date of Patent: May 28, 1985

[54] MAGNETIC RECORDING MEDIUM AND PROCESS FOR PRODUCING SAME

[75] Inventors: Nobuyuki Yamamoto, Shizuoka; Yasuo Nishikawa, Kanagawa; Kyoichi Naruo; Tsutomu Okita, both of Shizuoka, all of Japan

[73] Assignee: Fuji Photo Film Company Limited, Kanagawa, Japan

[21] Appl. No.: 350,509

[22] Filed: Feb. 19, 1982

[30] Foreign Application Priority Data

Mar. 24, 1981 [JP] Japan .................................. 56-43388

[51] Int. Cl.$^3$ ........................ H01F 10/02; B05D 5/12
[52] U.S. Cl. .................................... 428/336; 427/130; 427/131; 427/132; 427/250; 428/341; 428/423.7; 428/425.8; 428/694; 428/695; 428/900
[58] Field of Search ................................ 427/127–132, 427/48, 250; 428/900, 695, 425.8, 336, 341, 423.7, 694

[56] References Cited

U.S. PATENT DOCUMENTS 4,152,487  5/1979  Yanagisawa ....................... 428/900

*Primary Examiner*—Bernard D. Pianalto
*Attorney, Agent, or Firm*—Sughrue, Mion, Zinn, Macpeak, and Seas

[57] ABSTRACT

A magnetic recording medium having a thin magnetic film on a non-magnetic support base is disclosed. A layer of a compound which contains at least two isocyanate groups is formed in connection with the medium, and may be formed on either the surface of the metal film or the surface of the base opposite the metal film, or both. The resulting medium has excellent running properties, wear resistance and electro-to-magnetic conversion characteristics which are maintained after repeated use. The medium is formed by providing a non-magnetic support base surface and coating that surface with a thin magnetic metal film by use of a process such as vapor deposition. A solution of a compound containing at least two isocyanate groups is then applied to the medium within a solvent after which a heat treatment is carried out, thus forming the layer of compound containing the isocyanate groups.

17 Claims, No Drawings

MAGNETIC RECORDING MEDIUM AND PROCESS FOR PRODUCING SAME

FIELD OF THE INVENTION

The present invention relates to a magnetic recording medium using a thin magnetic film as a magnetic recording layer and, more particularly, to a magnetic recording medium of thin metal film type having good running properties, wear resistance and electro-to-magnetic conversion characteristics.

BACKGROUND OF THE INVENTION

Most of the conventional magnetic recording media are of the coated type. These media are produced by dispersing particles of magnetic oxides such as $\gamma$-$Fe_2O_3$, Co-doped $\gamma$-$Fe_2O_3$, $Fe_3O_4$, Co-doped $Fe_3O_4$, a Bertholide compound of $\gamma$-$Fe_2O_3$ and $Fe_3O_4$, $CrO_2$, etc., or ferromagnetic alloy particles in an organic binder such as a vinyl chloride/vinyl acetate copolymer, a styrene/butadiene copolymer, an epoxy resin or polyurethane resin, applying the resulting coating solution to a non-magnetic base, and drying the coating. However, due to a recently increasing demand for higher density recording, researchers' attention has been drawn to magnetic recording media of thin metal film type that uses, as a magnetic recording layer, a thin ferromagnetic metal film. The film is formed by the vapor deposition such as vacuum deposition, sputtering or ion plating, or the plating such as electroplating or electrolessplating. Various efforts have been made to use such recording media on a commercial basis.

Most of the magnetic recording media of coated type use a metal oxide having a small saturation magnetization as a magnetic material. Therefore, an attempt to achieve high density recording by using a thinner magnetic recording medium results in a decreased signal output. However, with a magnetic recording medium of thin metal film type, a very thin magnetic recording layer can be formed by using a ferromagnetic metal having a greater saturation magnetization than that of the magnetic oxide without using a non-magnetic material such as a binder. This thinness is very advantageous for providing good electro-to-magnetic conversion characteristics. However, the thin metal film type magnetic recording medium has its own problems: (1) it develops a large amount of friction against the magnetic head, guide poles or other transport means when it is run to record, reproduce or erase magnetic signals, and hence wears easily; (2) it is easily attacked by corrosive environments; and (3) the magnetic recording layer may be damaged on impact during handling.

Some attempts have been made to solve these problems by forming a protective layer on the magnetic recording medium of thin metal film type. One such proposal is described in Japanese Patent Application (OPI) No. 75001/75 (the term "OPI" as used herein refers to a "published unexamined Japanese patent application") wherein a thin lubricant layer is formed on the metal film. According to this proposal, the friction coefficient between the magnetic head or guide poles and the metal film is reduced, providing a tape that runs consistently and which is least likely to be abraded. However, these advantages are quickly lost if the tape is used repeatedly. Another method is described in Japanese Patent Application (OPI) Nos. 39708/78 and 40505/78 wherein a lubricant protective layer made of a metal or metal oxide is formed on the thin metal film. However, even when using this method, the effect of the protective layer does not last long. When the tape is used repeatedly, the friction coefficient is increased rapidly or the thin magnetic metal film breaks. Still another method is described in Japanese Patent Application (OPI) No. 155010/79 wherein an overcoat of a high molecular film is formed on the metal film. However, if the overcoat is made of vinylidene chloride/acrylic ester copolymer and other known high molecular substances, the resulting film thickness is at least about 0.2 $\mu$m and this causes spacing loss which in turn leads to reduced output in high density recording.

Further, most thin magnetic metal films are supported on a very smooth base to achieve high density recording. However, even when the lubricating methods described above are applied to such a smooth base, running properties, especially in highly humid atmospheres, and wear resistance of the base cannot satisfactorily be improved.

SUMMARY OF THE INVENTION

Therefore, one object of the present invention is to provide a magnetic recording medium of the thin metal film type that has good running properties, wear resistance and electro-to-magnetic conversion characteristics, as well as a process for producing the same.

Another object of the present invention is to provide a magnetic recording medium of thin metal film type that retains good running properties and wear resistance for an extended period of time, as well as a process for producing the same.

The present inventors have found that by forming a layer of a compound having at least two isocyanate groups in the molecule on either the thin magnetic metal film or the surface of the non-magnetic base opposite the thin magnetic metal film or both, improved results are obtained. The improved results obtained relate to a magnetic recording medium having good electro-to-magnetic conversion characteristics, running properties, wear resistance and great abrasion-proofness. Furthermore, these properties last for an extended period. The inventors have further found that the objects of the present invention can be achieved by forming a layer of a compound having at least two isocyanate groups in the molecule on either the thin magnetic metal film or the surface of the non-magnetic base opposite the thin magnetic metal film or both and then heat-treating said layer.

DETAILED DESCRIPTION OF THE INVENTION

The thin magnetic metal film used in the present invention can be formed by vapor deposition or plating. Vapor deposition is preferred since it forms the desired thin metal film rapidly, is a relatively simple process and requires no treatment of effluents or other additional steps. The vapor deposition is a process in which a substance or its compound is heated in a vacuum enclosure until its vapor or ionized vapor condenses on the surface of a base, and includes vacuum vapor deposition, sputtering, ion plating and chemical vapor phase plating.

The magnetic recording layer used in the present invention is a thin film that is formed by vapor deposition or plating of a ferromagnetic metal such as iron, cobalt or nickel, or a ferromagnetic alloy such as Fe—Co, Fe—Ni, Co—Ni, Fe—Si, Fe—Rh, Co—P, Co—B, Co—Si, Co—V, Co—Y, Co—La, Co—Ce, Co—Pr, Co—Sm, Co—Pt, Co—Mn, Fe—Co—Ni, Co—Ni—P, Co—Ni—B, Co—Ni—Ag, Co—Ni—Na, Co—Ni—Ce, Co—Ni—Zn, Co—Ni—Cu, Co—Ni—W, Co—Ni—Re, or Co—Sm—Cu. The thickness of the layer as used in the magnetic recording medium is preferably in the range of from 0.05 to 2 µm, more preferably from 0.1 to 0.4 µm.

The compounds which make up the layer to be formed on either the thin magnetic film or the base or both may be used either alone or in combination. Examples of the compound having at least two isocyanate groups in the molecule are 1,6-hexamethylene diisocyanate, 2,2,4-trimethylpentane diisocyanate, decane diisocyanate, ω,ω'-diisocyanate-1,2-dimethylcyclohexane, tolylene diisocyanate, ω,ω'-diisocyanate-1,5-dimethylnaphthalene, ω,ω'-diisocyanate-propylbiphenyl, diphenylmethane-4,4'-diisocyanate, 3,3'-dimethyldiphenylmethane diisocyanate, xylidene diisocyanate, alkyl- or halogen-substituted products of these diisocyanates (e.g., 2,5-dichloro-p-xylylene diisocyanate and tetrachloro-p-phenylene diisocyanate) and divalent diisocyanates such as 2,2'-dinitrodiphenyl diisocyanate; trivalent isocyanates such as triphenylmethane triisocyanate; polyvalent isocyanates such as adducts of diisocyanates, say, aliphatic diisocyanates, alicyclic diisocyanates having a cyclic group, tolylene diisocyanate, diphenylmethane diisocyanate and triphenylmethane diisocyanate with trimethylolpropane or pentaerythritol; and polymethylene polyphenylene polyisocyanates (PAPI). Of these, compounds having at least three isocyanate groups in the molecule are preferred.

To modify the physical properties of the surface of the layer, about 0.2 to 30% of a polymer such as cellulosic derivatives, polyurethanes or vinyl polymers may be added as required. If the amount of these polymers is too great, it is not possible to obtain one of the objects of this invention which is a highly wear resistant tape.

A layer of the compound having at least two isocyanate groups in the molecule can be formed on either the thin magnetic metal film or the non-magnetic base or both by any suitable method. Examples of such methods include applying a solution of said compound in an organic solvent onto the base and drying the same. The concentration of the coating solution is preferably in the range of from 0.05 to 5 wt %, and said solution is applied onto the base in such a manner that the dry weight of the layer is preferably in the range of from 1 to 100 mg/m$^2$, more preferably from 2 to 50 mg/m$^2$.

It is presumed that the isocyanate compound according to the present invention provides better running properties and higher wear resistance by reacting with water in air or in the solvent to form a polymer. To promote the reaction of the isocyanate compound, one or more compounds having active hydrogen such as water, alcohol, amine, carboxylic acid, phenol or carboxylic acid amide may be added to the coating solution. The same result can be achieved by heat-treating the dried layer of the compound having at least two isocyanate groups in the molecule. After applying the coating, it is heat treated to a temperature of at least 30° C., preferably at 50° C. or more, for a period of at least 3 seconds, preferably at a relative humidity of 30% or more. The heat treatment is particularly effective for improvement in the running properties and wear resistance.

For the purposes of the present invention, the compound having at least two isocyanate groups in the molecule may be used in combination with a lubricant. Suitable lubricants include aliphatic acids, metal soaps, aliphatic acid amides, aliphatic acid esters, mineral oils, vegetable oils, animal oils such as whale oil, higher alcohols, and silicone oil; fine, electrically conductive particulate materials such as graphite; fine inorganic particulate materials such as molybdenum disulfide and tungsten disulfide; fine particles of plastics such as polyethylene, polypropylene, polyethylene/vinyl chloride copolymer and polytetrafluoroethylene; α-olefin polymers; unsaturated aliphatic hydrocarbons that are liquid at ordinary temperatures (i.e., those compounds having an n-olefin double bond attached to a terminal carbon atom, with about 20 carbon atoms), fluorocarbons and mixtures thereof. Aliphatic acids, metal soaps, aliphatic acid amides, aliphatic acid esters, higher alcohols and mixtures thereof are preferred, and aliphatic acids having 10 or more carbon atoms are particularly preferred.

In addition to the lubricant, a conventional corrosion inhibitor or mold inhibitor may be used, as desired.

These lubricants are dissolved in an organic solvent together with the compound having at least two isocyanate groups in the molecule and the solution is applied onto the base. Alternatively, after the layer of the isocyanate-containing compound is formed by the methods described above, a lubricant layer may be formed by applying a solution of the lubricant in an organic solvent onto the layer, or by the vapor deposition process described before.

Examples of solvents used for the application of the compound containing at least two isocyanate groups in the molecule, as well as the lubricant include ketones such as acetone, methyl ethyl ketone, methyl isobutyl ketone and cyclohexanone; alcohols having 1 to 10 carbon atoms (excluding isocyanate-containing compounds) such as methanol, ethanol, propanol and butanol; esters such as methyl acetate, ethyl acetate, butyl acetate, ethyl lactate, and glycol acetate monoethyl ether; ether and glycol ethers such as glycol dimethyl ether, glycol monoethyl ether (excluding isocyanate-containing compounds) and dioxane; hydrocarbons such as pentane, hexane, heptane, octane, nonane and decane; tars (aromatic hydrocarbons) such as benzene, toluene and xylene; and chlorinated hydrocarbons such as methylene chloride, ethylene chloride, carbon tetrachloride, chloroform, ethylene chlorohydrin and dichlorobenzene.

The lubricant is generally used in a dry weight of from 2 to 100 mg/m$^2$, preferably from 2 to 50 mg/m$^2$, more preferably from 2 to 20 mg/m$^2$.

The recording medium of the present invention achieves the following advantages:

(1) When it is used on a tape deck, it experiences only a small increase in the dynamic friction coefficient. This means the medium is very stalbe to repeated running and has very high wear resistance;

(2) The medium retains high stability to repeated running even when it has a very smooth thin magnetic metal film and base;

(3) The medium has small dynamic friction coefficient and runs smoothly in humid atmospheres;

(4) The film of the compound having at least two isocyanate groups in the molecule is very thin, so it does not reduce the electro-to-magnetic conversion characteristics of the magnetic recording medium; and (5) The medium is hardly susceptible to corrosive attack under humid conditions and causes no reduction in the electro-to-magnetic conversion characteristics.

The present invention is now described in greater detail by reference to the following examples and comparative examples which are given here for illustrative purposes only and are by no means intended to limit the scope of the invention. In the examples and comparative examples, all parts are by weight.

EXAMPLE 1

A magnetic cobalt film (0.2μ thick) was formed on a polyethylene terephthalate film (20μ thick) by oblique deposition to prepare a magnetic tape, wherein electron beams were used to condense the vapor of cobalt (99.95% purity) which was directed onto the PET film at an angle of incidence of 70° at a pressure of $5 \times 10^{-5}$ Torr. A coating solution I for the compound having three isocyanate groups in the molecule having the formulation indicated below was applied onto the Co film and the base film of the magnetic tape in a dry amount of 10 mg/m², and was left to stand at 50° C. and 80% RH (relative humidity) for 2 hours.

| Coating Solution I | |
| --- | --- |
| Adduct of 1 mol of trimethylolpropane and 3 mols of toluene diisocyanate | 1.0 part |
| Methyl ethyl ketone | 200 parts |

A lubricant coating solution II of the formulation indicated below was applied onto the resulting layer in an amount of 10 mg/m² and dried at 50° C. for 10 seconds. The dried film was slit into a video tape ½ inch wide, the magnetic surface and the base surface of which were referred to as Sample Nos. 1 and 2, respectively.

| Lubricant Coating Solution II | |
| --- | --- |
| Myristic acid | 1.0 part |
| n-Hexane | 200 parts |

EXAMPLE 2

A magnetic tape was prepared in the same manner as in Example 1. Thereafter, a coating solution III for the compound having two isocyanate groups in the molecule having the formulation indicated below was applied to a cobalt film of the magnetic tape in a dry amount of 10 mg/m² and was allowed to stand at 50° C. and 80% RH for 2 hours. The resulting tape was then slit into a video tape ½ inch wide, the magnetic surface of which was referred to as Sample No. 3.

| Coating Solution III | |
| --- | --- |
| 1,6-Hexamethylene diisocyanate | 1.0 part |
| Methyl ethyl ketone | 200 parts |

EXAMPLE 3

The same procedures as in Example 2 were repeated to obtain a magnetic tape having a 1,6-hexamethylene diisocyanate layer formed on a cobalt film. Thereafter, the lubricant coating solution II was applied onto the 1,6-hexamethylene diisocyanate layer in the same manner as in Example 1. The dried film was slit into a video tape ½ inch wide, the magnetic surface of which was referred to as Sample No. 4.

EXAMPLE 4

A magnetic tape was prepared in the same manner as in Example 1. Thereafter, a coating solution IV for the compound having three isocyanate groups in the molecule having the formulation indicated below was applied on a base film of the magnetic tape in a dry amount of 10 mg/m², and was allowed to stand at 50° C. and 80% RH for 2 hours.

| Coating Solution IV | |
| --- | --- |
| Triphenylmethane triisocyanate | 1.0 part |
| Methyl ethyl ketone | 200 parts |

The lubricant coating solution II was applied onto the resulting layer in the same manner as in Example 1 and slit into a video tape ½ inch wide, the base surface of which is referred to as Sample No. 5.

COMPARATIVE EXAMPLE 1

A tape was prepared as in Example 1 except that a Co magnetic film was simply formed on a PET base by oblique deposition without forming a protective layer or a lubricant layer. The magnetic surface and the base surface of the tape were referred to as Sample Nos. C-1 and C-3.

COMPARATIVE EXAMPLE 2

A video tape ½ inch wide was prepared as in Example 1 except that only the lubricant coating solution II was applied to a Co magnetic film. The magnetic surface of the tape was referred to as Sample No. C-2.

The samples thus prepared were subjected to the following film durability (wear resistance) test and measurement of dynamic friction coefficient.

(1) Durability

Durability of a magnetic thin film was determined when pressing a magnetic tape against a magnetic heat at a tension of 90 g/½ inch and reciprocating at 38 cm/sec 500 times. The number of visually observed abrasions that were formed on the tape surface was counted.

(2) Measurement of Dynamic Friction Coefficient

The magnetic tape was reciprocated on a VHS video tape recorder (Maclord 88, Model NV-8800, of Matsushita Electric Industrial Co., Ltd.) once, 20 times, 100 times and 500 times, and the change in the dynamic friction coefficient (μ) was examined by the formula $T_2/T_1 = e^{\mu\pi}$ wherein $T_1$ was the tape tension at the supply side of the rotary cylinder and $T_2$ at the takeup side.

The test and measurement results are shown in Table 1. As for the surface of the base, only measurement of the dynamic friction coefficient was conducted with the tapes of Examples 1 and 4 and that of Comparative Example 1 (see Sample Nos. 2, 5 and C-3).

TABLE 1

| Sample No. | Sliding Face | Polymer Layer | Lubricant Layer | (1) Durability* after 500 Passes | (2) Change in Dynamic Friction Coefficient | | | |
| --- | --- | --- | --- | --- | --- | --- | --- | --- |
| | | | | | 1 | 20 | 100 | 500 |
| 1 | Magnetic | Adduct of 1 mol | Myristic | No abrasions observed | 0.28 | 0.29 | 0.31 | 0.34 |

TABLE 1-continued

| Sample No. | Sliding Face | Polymer Layer | Lubricant Layer | (1) Durability* after 500 Passes | (2) Change in Dynamic Friction Coefficient | | | |
|---|---|---|---|---|---|---|---|---|
| | | | | | 1 | 20 | 100 | 500 |
| | surface | of trimethylolpropane and 3 mols of toluene diisocyanate | acid | | | | | |
| 2 | Base surface | Adduct of 1 mol of trimethylolpropane and 3 mols of toluene diisocyanate | Myristic acid | — | 0.29 | 0.31 | 0.33 | 0.35 |
| 3 | Magnetic surface | 1,6-Hexamethylene diisocyanate | — | No abrasions observed | 0.32 | 0.35 | 0.38 | 0.44 |
| 4 | Magnetic surface | 1,6-Hexamethylene diisocyanate | Myristic acid | No abrasions observed | 0.29 | 0.31 | 0.35 | 0.40 |
| 5 | Base surface | Triphenylmethane triisocyanate | Myristic acid | — | 0.29 | 0.31 | 0.34 | 0.38 |
| C-1 | Magnetic surface | — | — | More than 10 deep abrasions | 0.48 | 0.55 | 0.58 | 0.67 |
| C-2 | Magnetic surface | — | Myristic acid | More than 10 deep abrasions | 0.30 | 0.33 | 0.41 | 0.48 |
| C-3 | Base surface | — | — | — | 0.35 | 0.40 | 0.57 | 0.59 |

*The durability was expressed in terms of the number of abrasions which appeared over the whole width of the tape at an optical portion of the tape.

One can see from Table 1 that the magnetic recording medium of thin metal film type according to the present invention has very good running properties and wear resistance. Further, the improvement in these properties is retained for an extended period of time. Furthermore, it can be seen from the comparison of Sample Nos. 1, 2 and 5 with Sample Nos. 3 and 4 that a compound having three or more isocyanate groups provides the superior effect in the change in dynamic friction coefficient after repeated running to that of a compound having two isocyanate groups. It is presumed that the former reacts with water in air or solvent to form a three-dimensional cross-linked structure, whereby the resulting polymer has an increased strength concerning the running properties and wear resistance as compared to the latter. In addition, since a lubricant has a remarkable effect for reducing the dynamic friction coefficient, it is preferably used in the present invention, while the wear resistance cannot be improved using a lubricant alone.

While the invention has been described in detail and with reference to specific embodiments thereof, it will be apparent to one skilled in the art that various changes and modifications can be made therein without departing from the spirit and scope thereof.

What is claimed is:

1. A magnetic recording medium consisting essentially of:
   a non-magnetic support base;
   a thin magnetic metal layer formed on a surface of said non-magnetic support base; and
   a layer consisting essentially of a compound containing at least two isocyanate groups formed on either said thin magnetic metal layer or the surface of said non-magnetic support base opposite said thin magnetic metal layer or both, in order to improve wear resistance and running properties.

2. A magnetic recording medium as claimed in claim 1, wherein said compound contains at least three isocyanate groups.

3. A magnetic recording medium as claimed in any of claims 1 or 2, wherein said thin magnetic metal film has a thickness within the range of 0.05 to 2 μm.

4. A magnetic recording medium as claimed in claim 3, wherein said thickness is within the range of 0.1 to 0.4 μm.

5. A magnetic recording medium as claimed in any of claims 1 or 2, wherein said layer of said compound is further comprised of a lubricant.

6. A magnetic recording medium as claimed in claim 5, wherein said lubricant is an aliphatic acid containing 10 or more carbon atoms.

7. A magnetic recording medium as claimed in claim 6, wherein said lubricant is disposed on said medium in a dry weight of from 2 to 100 mg/m$^2$.

8. A magnetic recording medium as claimed in claim 7, wherein said dry weight is within the range of 2 to 50 mg/m$^2$.

9. A magnetic recording medium as claimed in claim 8, wherein said dry weight is within the range of from 2 to 20 mg/m$^2$.

10. A magnetic recording medium as claimed in any of claims 1 or 2, wherein said layer of said compound is contained on said medium in an amount within the range of 1 to 100 mg/m$^2$.

11. A magnetic recording medium as claimed in claim 10, wherein said compound is contained on said medium in an amount within the range of 2 to 50 mg/m$^2$.

12. A process for producing a magnetic recording medium having improved wear resistance and running properties, consisting essentially of the steps of:
    providing a non-magnetic support base surface;
    applying a thin magnetic metal film to said surface of said non-magnetic support base by means of vapor deposition;
    forming a layer consisting essentially of a compound containing at least two isocyanate groups on either said thin magnetic metal film or the surface of said non-magnetic support base opposite said thin magnetic metal layer or both; and
    heat-treating said layer consisting essentially of said compound.

13. A process as claimed in claim 12, wherein said heat-treatment is carried out at a temperature of 30° C. or more for a period of 3 seconds or more.

14. A process as claimed in claim 13, wherein said heat-treatment is carried out at a temperature of 50° C. or more at a relative humidity of 30% or more.

15. A process as claimed in claim 14, wherein said layer of compound is formed by applying a solution of said compound whose concentration is in the range of from 0.05 to 5 wt %.

16. A magnetic recording medium as claimed in claim 1, wherein said layer consisting essentially of a compound containing at least two isocyanate groups contains at least 70% of said compound.

17. A process for producing a magnetic recording medium as claimed in claim 12, wherein the forming of the layer consisting essentially of a compound containing at least two isocyanate groups is carried out using a composition containing at least 70% of said compound.

* * * * *